United States Patent [19]
Newstead et al.

[11] 3,882,972
[45] May 13, 1975

[54] DISC BRAKE WITH IDENTICAL REMOVABLE FRICTION PADS

[75] Inventors: Charles Newstead, Walsall; Andrew Charles Walden Wright, Lapworth, both of England

[73] Assignee: Girling Limited, Birmingham, England

[22] Filed: June 20, 1972

[21] Appl. No.: 264,533

[30] Foreign Application Priority Data
June 22, 1971 United Kingdom............... 29295/71

[52] U.S. Cl................................ 188/72.5; 188/73.6
[51] Int. Cl........................................... F16d 55/228
[58] Field of Search ........ 188/72.4, 72.5, 73.3, 73.6

[56] References Cited
UNITED STATES PATENTS

| | | | |
|---|---|---|---|
| 3,119,468 | 1/1964 | Mossey | 188/72.5 |
| 3,194,351 | 7/1965 | Swift | 188/73.6 X |
| 3,199,635 | 8/1965 | Bessler et al. | 188/73.3 X |
| 3,261,430 | 7/1966 | Wilson et al. | 188/73.6 |
| 3,285,371 | 11/1966 | Cadiou | 188/73.6 |
| 3,625,314 | 12/1971 | Rinker | 188/73.3 X |
| 3,682,277 | 8/1972 | Brown | 188/73.3 |

FOREIGN PATENTS OR APPLICATIONS 973,738   10/1964   United Kingdom................ 188/73.6

*Primary Examiner*—George E. A. Halvosa
*Attorney, Agent, or Firm*—Scrivener Parker Scrivener and Clarke

[57] ABSTRACT

The brake pads of a disc brake are retained in the housing by a pair of pins, each engaging its own pad. The pads are prevented from tilting about their pins by other means which can be further pins. If these further pins fit into slots in the ends of the pads, it is not necessary to remove them during pad removal. A detent can be provided to hold the brake pistons in their cylinders during pad removal.

7 Claims, 12 Drawing Figures

DISC BRAKE WITH IDENTICAL REMOVABLE FRICTION PADS

The present invention relates to disc brakes of the type in which a rotatable disc is gripped frictionally between opposed brake pads.

Disk brakes are very suitable for heavy commercial vehicles and earth-moving plant, but there are problems in replacing worn pads. Often the road wheel has to be removed to allow access. Moreover the pads are retained by bolts which each engage both pas and which when removed free both pads so that both new pads have to be manipulated simultaneously during replacement. With bolts which each engage both pads, there is a further problem; due to manufacturing tolerances the load taken by each bolt is indeterminate and each bolt must therefore be capable of taking the entire drag-load from both pads. This leads to the use of large bolts which in turn leads to design problems.

According to the present invention, a disc brake assembly comprises a housing, opposed friction pads, means for urging the pads together, and friction pad locating means, the friction pad locating means comprising a pair of removeable drag-taking pins, one associated with each pad, and a pair of friction pad anti-rotation pins, one associated with each pad, mounted in the housing in spaced relationship to the drag-taking pins.

The diameters of the drag-taking pins need sufficient for each pin to take the drag load from a single pad. In this specification; "drag" means the sideways force on the pad when braking tending to draw the pad along with the disc and "drag-load" is the the maximum expected or design drag.

Because the pins are associated with separate pads, removal of a single pad is possible. If the anti-rotation pins engage in open ended slots, it is only necessary to remove a single drag-taking pin to release a pad and replacement is easier since the single pin has to be inserted through a single pad. Replacing a pad can also be facilitated in the practice of the present invention by providing moisture and dirt excluding seals to stop the drag-taking pins bonding themselves to the housing by corrosion.

Embodiments of the invention will now be described, by way of example, with reference to the accompanying drawings.

THE DRAWINGS

FIG. 1 is a side view of a disc brake assembly,
FIG. 2 is a cross-section on line II—II of FIG. 1,
FIG. 3 is an end view of the assembly of FIG. 1,
FIG. 4 is a detail section on line IV—IV of FIG. 1,
FIG. 5 illustrates a drag-taking pin differing from that used in the embodiment of FIGS. 1 to 3,
FIG. 6 shows another drag-taking pin,
FIG. 7 shows a further drag-taking pin,
FIG. 8 is a yet further drag-taking pin,
FIG. 9 is yet another drag-taking pin,
FIG. 10 is a slight modification of FIG. 5,
FIG. 11 is still yet another drag-taking pin, and
FIG. 12 illustrates the removal of a pad.

DETAILED DESCRIPTION OF THE EMBODIMENTS

Figure 1:
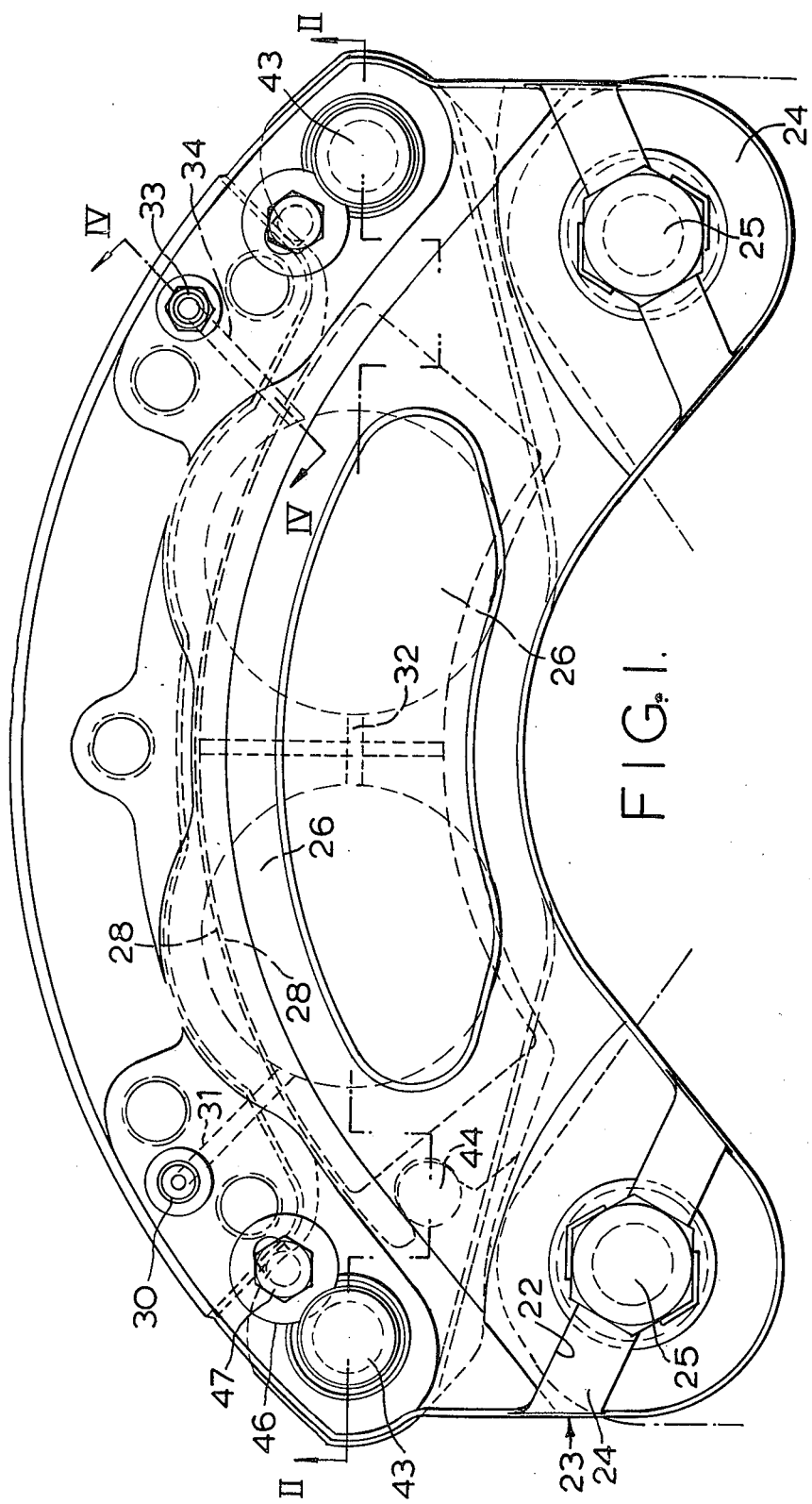
Figure 2:
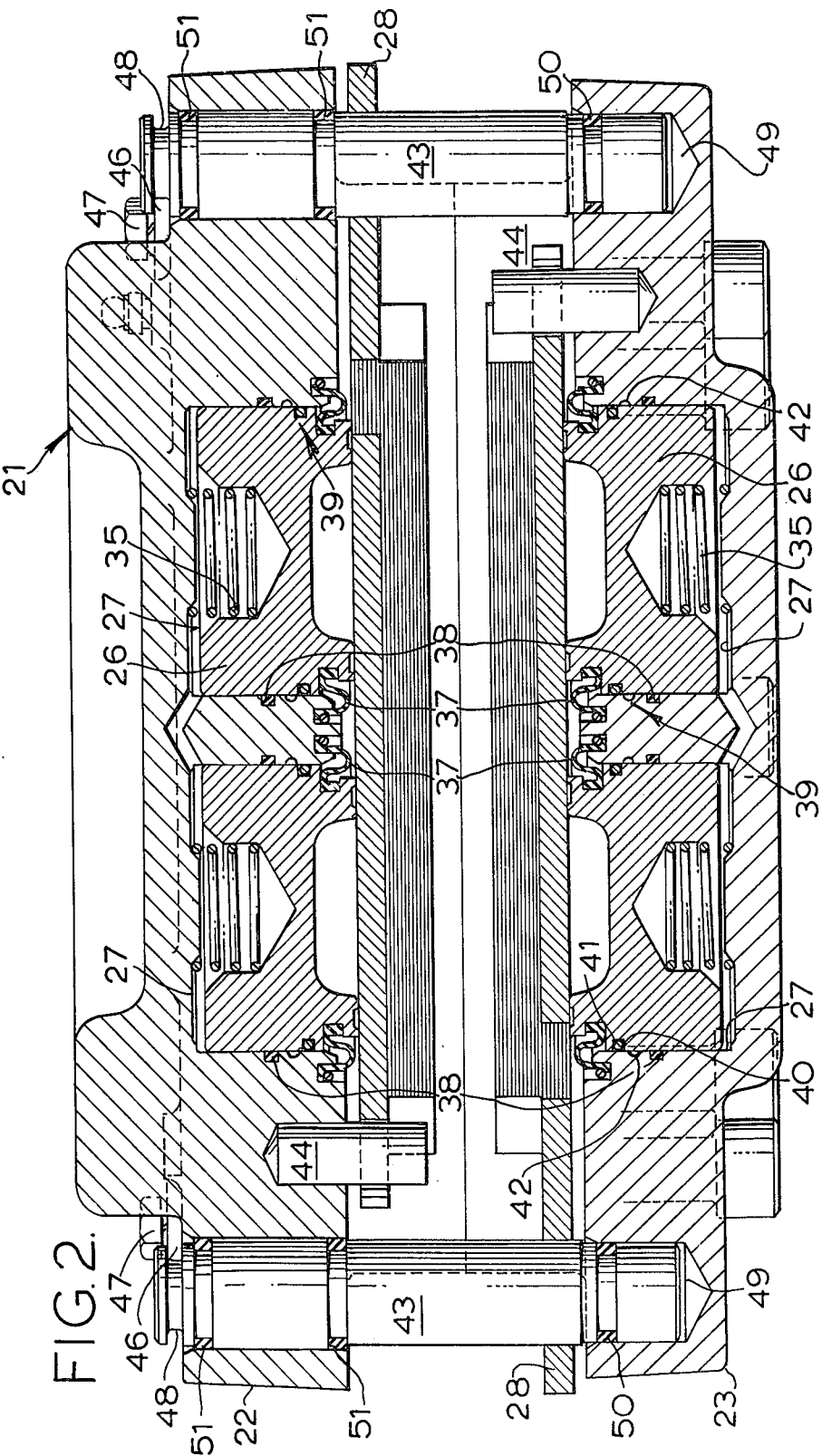
Figure 3:
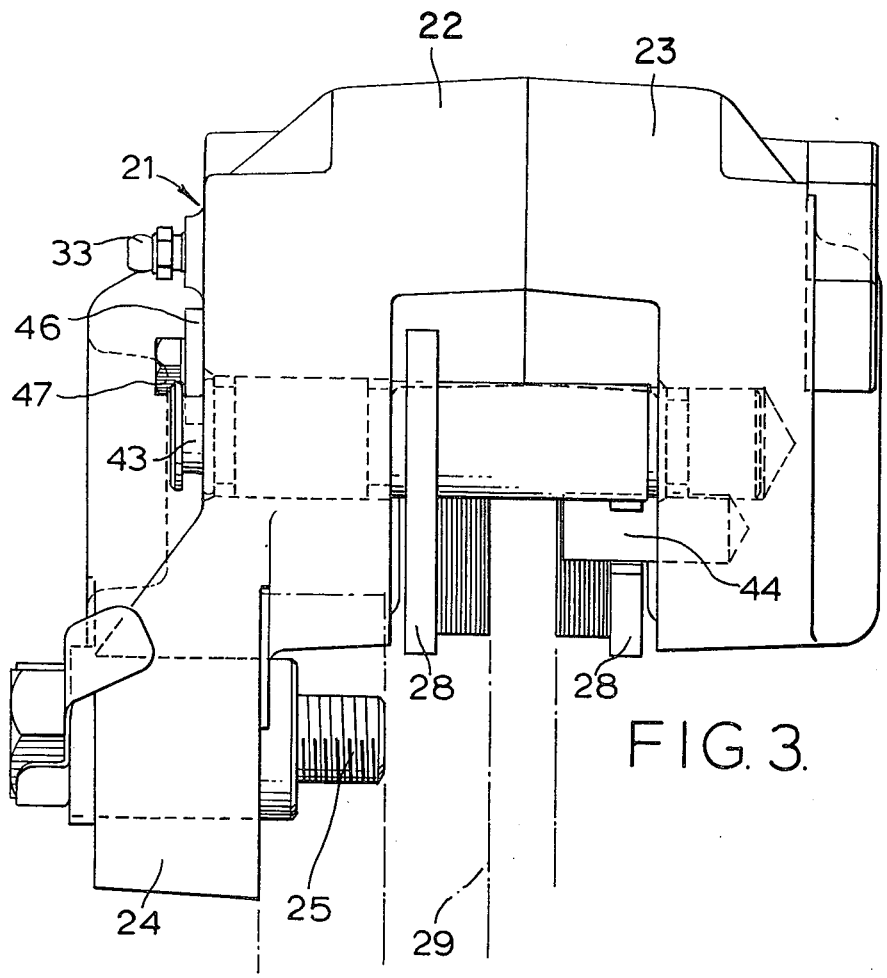

The disc brake assembly of FIGS. 1 to 3 comprises a housing 21 made in two substantially identical parts 22 and 23 of which, one part 22 is intended to be at the out-side of the associated road wheel and the other of which parts situated on the chassis side of the road wheel has attachment lugs 24 and bolts 25 whereby the assembly can be mounted on the vehicle. There are other minor differences beween the two parts but these will be described hereinbelow.

Figure 4:
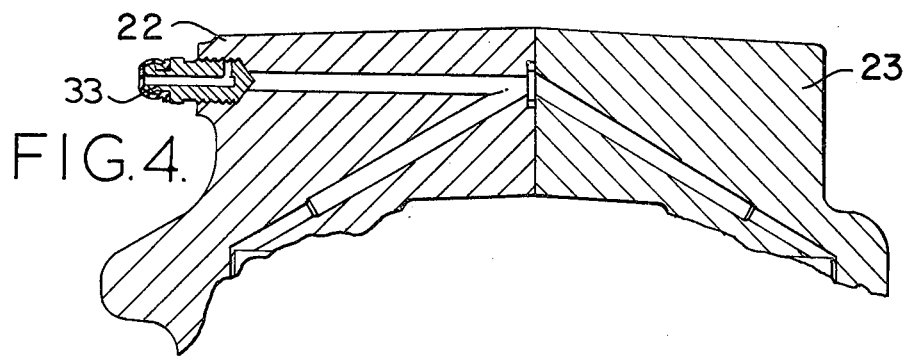

In each part there is a pair of pistons 26, each disposed in a respective cylinder 27. These pistons 26 abut against a pair of brake pads 28 disposed one each side of a brake disc 29 shown in FIG. 3 as a broken line and actuable to urge the pads together. The hydraulic fluid from the brake master cylinder enters the housing through a connector 30 on the part 23 and passes through a bifurcated duct 31 into one of the cylinders of each of the parts 22 and 23; the pair of cylinders in each part being connected by a further duct 32. A bleed duct from the second cylinder in each pair and a manifold leading to a suitable nipple 33 are shown in FIG. 4, the bleed duct and the manifold are identified in FIG. 1 by the reference numeral 34.

A spring 35 is disposed in each cylinder 27 to urge the pads continually into light rubbing contact with the disc to keep the disc free from accumulated dirt; this is highly desirable in earth-moving plant. These springs are troublesome during pad replacement since they push the pistons out and into the insertion path of the new brake pads and the pistons have to be pushed home into the cylinders to allow the new pads to be manipulated into position. For this reason each piston and cylinder co-operates not only by means of the usual rolling dirt-excluding seal 37 and piston 38 but also by means of an over-ridable or releasable detent 39. The detent shown in FIG. 2 is of the over-ridable variety and comprises a resilient ring 40 in a groove 41 in the piston which springs out when the piston is pushed back into the cylinder to engage in a suitably profiled groove 42; the spring 35 should not be sufficiently powerful to force the piston to release itself from the detent but the detent should not be able to hold the piston when it is actuated by hydraulic fluid. Other forms of detents could be used; for example, a slide which fitted in a groove in the piston and which is releasable by pulling it away from engagement with the groove. It is clear that the disposition of the various forms of the detent could be varied; for example in the illustrated embodiment, the ring 40 could fit into a groove in the cylinder rather than the piston and the detent could operate when the piston exceeded its normal travel outwardly rather than having to be pushed inwardly.

The friction pads 28 are located on drag-taking pins 43 and anti-rotation pins 44 for sliding movement therealong. Each pad has a hole at one end through which passes a drag-taking pin 43 and a slot at the other end through which passes with clearance an anti-rotation pin 44. Each pad is associated with only one pin 43 and one 44. Each pad is associated with only one of the pins 43 and only one of the pins 44 and each pin is associated with only one of the pads. The pins 43 are disposed outside the outer diameter of the brake disc and can therefore extend between the two parts 22 and 23; whereas the pins 44 do not extend between the two parts 22 and 23 and can therefore be disposed within the outer diameter of the brake disc. Since slots are used for the pins 44 they do not have to be released from the brake pads to enable the brake pads to be replaced and can be in the form of studs as illustrated in FIG. 2. The drag-taking pins 43 must have heads which are accessible when it is desired to replace the brake pads and are conveniently threadedly engaged with the part 23 with their heads accessible on the part 22. Alternatively and as shown in FIG. 2, each pin 43 can be a sliding fit in both parts of the housing and retained by a suitable keeper 46 which is retained on the housing by a bolt 47. In FIG. 2 the keeper is merely a washer which engages in a groove 48 in the pin 43. The pins 43 preferably fit into blind holes 49 in the part 23 and a seal 50 of non-perishable elastomer prevents dirt and moisture entering each blind hole and promoting corrosion causing the pin to be permanently locked in this blind hole. Similar seals 51 are provided at each end of the hole in the part 22 through which each pin 43 passes.

The pins 43 can take many forms; some of which will now be described.

Figure 5:
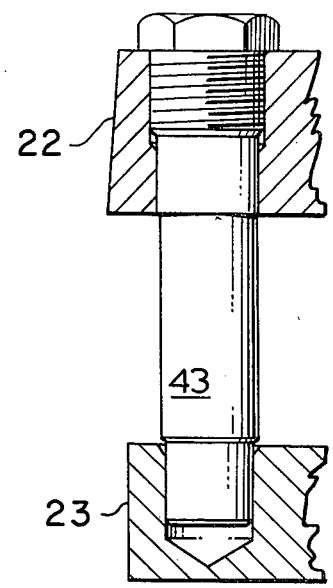

In FIG. 5, the pin 43 is screw-threaded into the part 22 and slides into the part 23; only a small length of the pin adjacent the hexagon head is threaded. Seals are fitted but these are not shown in the drawing for the sake of simplicity. The advantage of the construction shown in FIG. 5 is that the thread provides an extraction force.

Figure 6:
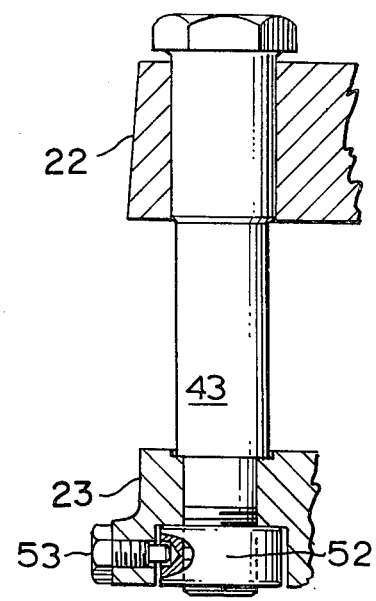

In FIG. 6, a threaded collar 52 retained loosely but non-rotationally in the outer (or most inwardly) face of the part 23 by means of a grub screw 53 co-operates with the pin 43 to hold it in position. The pin again has a hexagonal head and suitable seals are provided.

Figure 7:
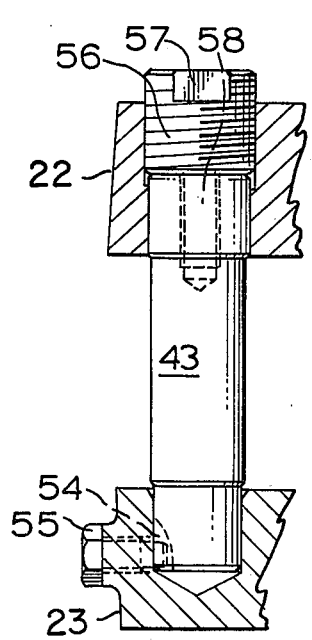

In FIG. 7, the pin proper is not threaded but has a key way 54 at one end which co-operates with an anti-rotation grub screw 55 and is held at its other end by a threaded keeper 56. This keeper has a plurality of flats 57 to enable the keeper to be unscrewed. When the keeper is removed, an internal threaded bore 58 in the pin 43 is exposed. By using an extractor plate and a bolt in this bore the pin can be removed. The key-way is of course to allow the extractor plate bolt to engage in the bore, without it awkwardly rotating.

Figure 8:
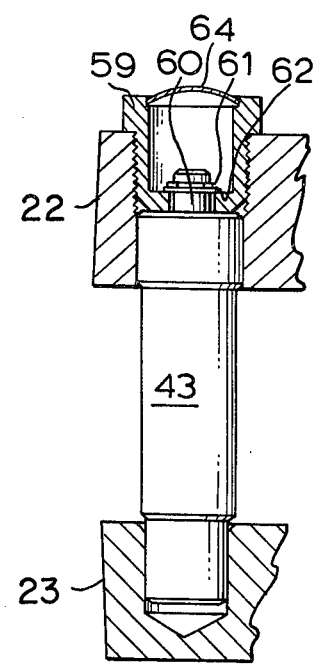

In FIG. 8, the pin 43 again does not extend to the outside of the part 22 but co-operates with a threaded keeper 59. The keeper in this Figure is cup-shaped with a hollow interior into which projects through a hole in the bottom of the keeper a spigot 60. The keeper is locked onto this spigot by a circlip 61 and washer 62 in such a way that the keeper is free to rotate relative to the pin 43. A removeable cover 64 is fitted to the keeper. The keeper has an hexagonal head 65.

Figure 9:
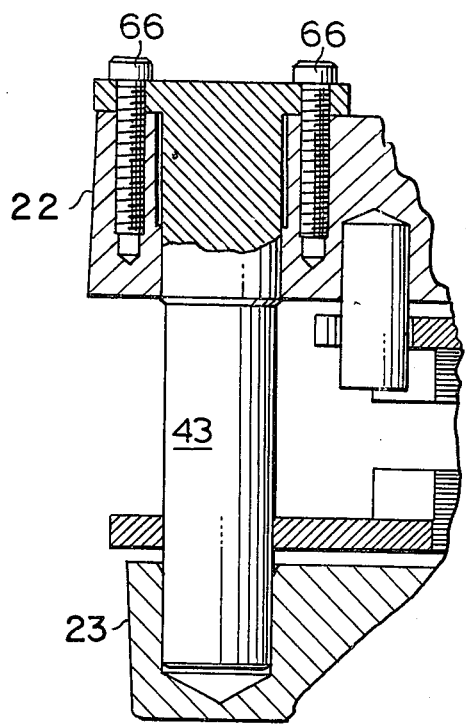

In FIG. 9, a construction which is very similar to the construction of FIG. 2 is illustrated. Instead of the pin being retained by a keeper, the head of the pin is plate-like and is secured by bolts 66. Some means for allowing the plate-like head to be gripped is provided.

Figure 10:
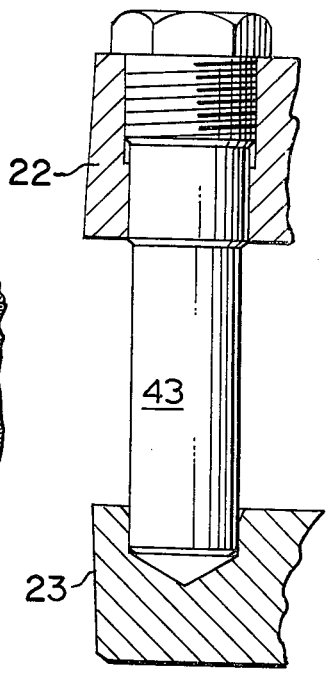

FIG. 10 shows only a minor alteration to FIG. 5. The pin 43 extends to the bottom of the hole in the part 23. In FIG. 5, the pin had an extra step at its lower end.

Figure 11:
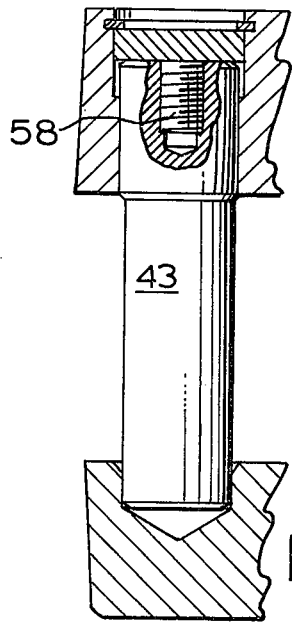

FIG. 11 shows a modification to FIG. 7. Instead of the keeper being screw-threaded, it is a mere plug retained by a circlip. Again it is intended to be used with an extractor plate and a bolt fitting into the tapped hole or threaded bore 58.

Figure 12:
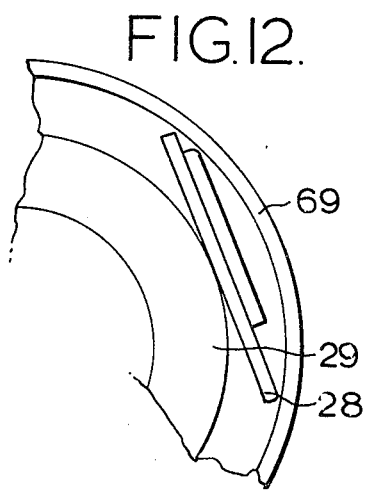

FIG. 12 illustrates the removal of a brake pad without road-wheel removal. The pad is slipped out of the housing and moved peripherally to a clear space wherein it can be turned and brought out through the annular space between the disc 29 and the flange of the road-wheel 69. Due to the use of the invention the pads can be relatively short in the arcuate direction. This facilitates removal of the pads; the outboard pad is merely slid out but the inboard pad is in a confined space between the road wheel and the disc but the size of the pad rendered possible by the use of the invention makes it easy to twist the pad and remove it through the gap between the disc and the road wheel.

The anti-rotation pins 44 can be integrally cast in the housing or be roll-pins or other round pins: it is even possible to use other means such as splines to hold the pads against rotation.

It will be noted that, in FIG. 2, the pins 43 are grooved for the retention of the seals 50 and 51 so that each pin with the seals thereon can be removed as a single sub-assembly without any risk of losing a seal or of a left-behind seal interfering with the re-insertion of the pin.

In the appended claims references to the housing having two parts does not exclude the parts forming parts of an integral housing. In other words "parts" is used in the spatial sense and does not mean discrete component.

We claim:

1. A disc brake assembly for co-operation with a brake disc mounted co-axially with, and on one side of a road wheel, the assembly comprising a fixed housing having two parts with a gap between the parts for the passage of the periphery of the disc, the housing being symmetrical about its mid-plane which includes the axis of rotation of the disc, a pair of identical arcuate friction pads moveable relative to the housing and having friction linings which face each other and are arranged to abut on opposite faces of the disc, each pad having leading and trailing ends in relation to one direction of rotation of the disc and having a single lug-like projection intended to extend outside the diameter of the disc at one end and a slot at the other, since the pads are arranged so that the linings face each other the lug-like projections of the pads will lie one at a leading end and one at a trailing end of its respective pad, a pair of removable drag-taking pins each engaged in holes provided therefor in both parts of the housing outside the periphery of a disc and in a hole in one of said lug-like projections, a pair of pins engaged each in a single part of the housing within the diameter of the disc and projecting from the respective part into the slot of the respective pad but remaining clear of the intended position of the disc, and means in said housing for urging the pads towards each other the arrangement of the drag-taking pins and the respective holes in the housing parts being such that the drag-taking pins are insertable and removable from that side of the housing which is remote from the road wheel.

2. An assembly according to claim 1 wherein the drag-taking pins have heads to enable them to be gripped more easily for removal and replacement.

3. An assembly according to claim 2 wherein the drag-taking pins are in screw-engagement with one of the housing parts.

4. An assembly according to claim 3 wherein the drag-taking pins are in screw-engagement with the wheel-side part of the housing.

5. An assembly according to claim 1 wherein seals are provided to minimise the risk of the drag-taking pins seizing in the holes.

6. An assembly according to claim 1 wherein the drag-taking pins are grooved for the retention of seals so that the pins are prevented from being corroded into making holes in the housing and so that the pins complete with seals can be removed each as a single subassembly during pad replacement.

7. An assembly according to claim 1 wherein said urging means is at least one hydraulic piston and wherein a releasable detent is provided to engage the piston during pad removal.

* * * * *